United States Patent
Lin

(10) Patent No.: US 10,359,688 B2
(45) Date of Patent: *Jul. 23, 2019

(54) METHOD AND DEVICE FOR CAMERA RAPID AUTOMATIC FOCUSING

(71) Applicant: BEIJING QIHOO TECHNOLOGY COMPANY LIMITED, Beijing (CN)

(72) Inventor: Tienan Lin, Beijing (CN)

(73) Assignee: BEIJING QIHOO TECHNOLOGY COMPANY LIMITED (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/740,408

(22) PCT Filed: Dec. 15, 2016

(86) PCT No.: PCT/CN2016/110127
§ 371 (c)(1),
(2) Date: Dec. 28, 2017

(87) PCT Pub. No.: WO2017/107839
PCT Pub. Date: Jun. 29, 2017

(65) Prior Publication Data
US 2018/0284574 A1 Oct. 4, 2018

(30) Foreign Application Priority Data

Dec. 23, 2015 (CN) .......................... 2015 1 0982071

(51) Int. Cl.
- G03B 13/36 (2006.01)
- G02B 7/36 (2006.01)
- H04N 5/232 (2006.01)

(52) U.S. Cl.
CPC .............. *G03B 13/36* (2013.01); *G02B 7/36* (2013.01); *G02B 7/365* (2013.01); *H04N 5/23212* (2013.01); *H04N 5/232123* (2018.08)

(58) Field of Classification Search
CPC ................................................ H04N 5/232123
See application file for complete search history.

(56) References Cited

U.S. PATENT DOCUMENTS

| 5,566,380 A | 10/1996 | Honma | |
| 5,739,858 A * | 4/1998 | Suda | G02B 7/365 |
| | | | 348/353 |

(Continued)

FOREIGN PATENT DOCUMENTS

| CN | 101790043 A | 7/2010 |
| CN | 103513395 A | 1/2014 |

(Continued)

OTHER PUBLICATIONS

English Translation of ISR dated Feb. 6, 2017 From Corresponding PCT Appl. No. PCT/2016/110127.

(Continued)

*Primary Examiner* — Cynthia Segura
(74) *Attorney, Agent, or Firm* — Grogan, Tuccilo & Vanderleeden, LLP

(57) ABSTRACT

The disclosure discloses a method and device for camera rapid automatic focusing. The method comprises: driving a lens to move to multiple different focus positions to acquire image data of a object, and calculating a corresponding estimated focus value in a first high frequency and a corresponding determined focus value in a second high frequency for each image data; calculating a rate of change between a current determined focus value and a previous determined focus value, and determining a direction of movement of the lens on the basis of the rate of change being either positive or negative; comparing the rate of change with a preset focus change threshold, and determining a speed of movement of the lens on the basis of a comparison result; and repeating (Continued)

said steps until the lens moves to a focus position corresponding to a maximum of the estimated focus values.

20 Claims, 2 Drawing Sheets

(56) References Cited

U.S. PATENT DOCUMENTS

| | | | | |
|---|---|---|---|---|
| 5,798,793 A * | 8/1998 | Tanaka | ................ | H04N 5/23212 348/347 |
| 7,812,880 B2 * | 10/2010 | Ohta | ................... | H04N 5/23212 348/345 |
| 10,225,501 B2 * | 3/2019 | Takinoiri | ............. | H04N 5/3696 |
| 2004/0227843 A1 * | 11/2004 | Watanabe | .......... | H04N 5/23212 348/354 |
| 2009/0244359 A1 * | 10/2009 | Ohta | ....................... | G03B 13/36 348/354 |
| 2012/0236198 A1 * | 9/2012 | Hamada | ............. | H04N 5/23212 348/352 |
| 2013/0234021 A1 * | 9/2013 | Sohn | ........................ | H01J 37/26 250/307 |
| 2014/0340562 A1 * | 11/2014 | Kudo | .................. | H04N 5/23212 348/345 |
| 2018/0007295 A1 * | 1/2018 | Takinoiri | ............ | H04N 5/23212 |
| 2018/0063413 A1 * | 3/2018 | Yoshino | .................. | G03B 7/006 |
| 2018/0316869 A1 * | 11/2018 | Lin | .................. | H04N 5/232123 |

FOREIGN PATENT DOCUMENTS

| | | |
|---|---|---|
| CN | 105391945 A | 3/2016 |
| CN | 105430279 A | 3/2016 |

OTHER PUBLICATIONS

Written Opinion of the ISR dated Feb. 16, 2017 From Corresponding PCT Appl. No. PCT/2016/110127.

* cited by examiner

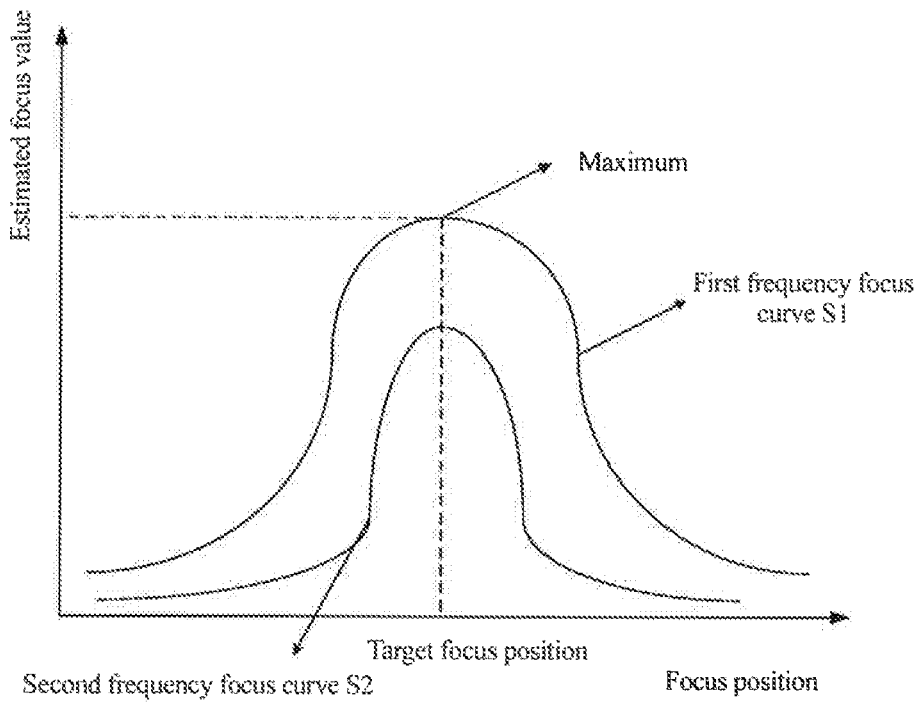

FIG.1

```
A focus value calculation step of driving a lens to move to multiple different focus positions
to acquire respective image data of a certain object, and calculating a corresponding
estimated focus value in a first high frequency and a corresponding determined          S11
focus value in a second high frequency for each image data, wherein a frequency value
in the second high frequency is greater than a frequency value in the first high frequency
```

```
A direction determination step of calculating a rate of change between
a current determined focus value and a previous determined focus value, and       S12
determining a direction of movement of the lens in a next movement on the
basis of the rate of change being either positive or negative
```

```
A speed determination step of comparing the rate of change with a preset
focus change threshold, and determining a speed of movement of the lens     S13
in the next movement on the basis of a comparison result
```

```
Repeatedly performing said focus value calculation step, said local pole
judgement step and said speed determination step, until the lens moves to a     S14
focus position corresponding to a maximum of the estimated focus values
```

FIG.2

METHOD AND DEVICE FOR CAMERA RAPID AUTOMATIC FOCUSING

CROSS REFERENCE TO RELATED APPLICATIONS

This application is national stage application of PCT/CN2016/110127 filed Dec. 15, 2016, and is based upon and claims priority to Chinese Patent Application No. 201510982071.0, filed in China on Dec. 23, 2015, the entire contents of which are incorporated herein by reference.

TECHNICAL FIELD

The disclosure relates to the technical field of focusing, and particularly to a method and device for camera rapid automatic focusing.

BACKGROUND

Due to the wide application of photoelectric image sensors CCDs and CMOSs in the field of image video, digital cameras and video cameras have been made ubiquitous in engineering application and daily life. The main functions of both the digital cameras and the video cameras are acquiring clear images, i.e. enabling the definition of images to be optimal by adjusting a position of a camera focus lens group. Thus, a focusing technique already becomes the key of imaging products, in particular video cameras.

At present, an automatic focus technique based on digital image processing has gradually replaced the traditional automatic focus method based on ranging principle. The automatic focus technique based on digital image processing utilizes a certain digital image processing algorithm to acquire an evaluated focus value capable of judging the definition of an image, which is generally a high-frequency component value of image data, and according to this evaluated value, adopts certain algorithm and strategy to control a focus motor of a lens to move to reach a focus position corresponding to the evaluated focus value, so as to acquire a clear image.

However, the automatic focus algorithm in the prior art employs a fixed small step length when performing a search for the travel of the focus motor, and thus will cause a wastage of focusing time due to a slow focus speed and will cause a problem of shaking due to being trapped at a local pole. However, although increasing the step length employed at the time of searching (reducing sampling points) can increase a speed of automatic focusing, sparse sampling near a peak value will make focusing precision not high. It is difficult for most of the currently employed methods and devices for automatic focusing to reach balance between speed and precision.

SUMMARY

An object of the disclosure is to provide a method for automatic focus control and a device employing the method in order to solve aforesaid at least one problem.

To achieve the object, the disclosure adopts the following technical solution:

The disclosure provides a method for camera rapid automatic focusing, comprising:

a focus value calculation step of driving a lens to move to multiple different focus positions to acquire respective image data of a certain object, and calculating a corresponding estimated focus value in a first high frequency and a corresponding determined focus value in a second high frequency for each image data, wherein a frequency value in the second high frequency is greater than a frequency value in the first high frequency;

a direction determination step of calculating a rate of change between a current determined focus value and a previous determined focus value, and determining a direction of movement of the lens in a next movement on the basis of the rate of change being either positive or negative;

a speed determination step of comparing the rate of change with a preset focus change threshold, and determining a speed of movement of the lens in the next movement on the basis of a comparison result; and repeatedly performing said focus value calculation step, said direction determination step and said speed determination step until the lens moves to a focus position corresponding to a maximum of the estimated focus values.

According to another aspect of the disclosure, the disclosure further provides a device for camera rapid automatic focusing, comprising:

a focus value calculation module for driving a lens to move to multiple different focus positions to acquire respective image data of a certain object, and calculating a corresponding estimated focus value in a first high frequency and a corresponding determined focus value in a second high frequency for each image data, wherein a frequency value in the second high frequency is greater than a frequency value in the first high frequency;

a direction determination module for calculating a rate of change between a current determined focus value and a previous determined focus value, and determining a direction of movement of the lens in a next movement on the basis of the rate of change being either positive or negative;

a speed determination module for comparing the rate of change with a preset focus change threshold, and determining a speed of movement of the lens in the next movement on the basis of a comparison result; and a movement module for repeatedly performing said focus value calculation step, said direction determination step and said speed determination step until the lens moves to a focus position corresponding to a maximum of the estimated focus values.

According to yet another aspect of the disclosure, there is provided a computer program comprising a computer readable code that, when run on a terminal device, causes the terminal device to implement any aforesaid method for camera rapid automatic focusing.

According to still another aspect of the disclosure, there is provided a computer readable medium storing therein the computer program for implementing any aforesaid method for camera rapid automatic focusing.

Compared with the prior art, the disclosure has the following advantages:

The disclosure provides a method for camera rapid automatic focusing, which: acquires image data of an object at multiple different focus positions between a lens and the object; and calculates an estimated focus value in a first high frequency and a determined focus value in a second high frequency for each image data; and calculates a rate of change between a current determined focus value and a previous determined focus value, and determines a direction of movement of the lens in a next movement on the basis of a comparison result of the rate of change with a preset focus change threshold, until the lens moves to a focus position corresponding to a maximum of the estimated focus value. That is, the disclosure can change a speed of movement of the lens on the basis of a value of the rate of change, that is, employ different speeds of movement at different positions, thus effectively reducing focusing time, while taking into consideration focusing speed and precision, and providing high reliability and practicability.

Additional aspects and advantages of the disclosure will be partly given in the following descriptions, which will become apparent from the following descriptions or be appreciated through the implementation of the disclosure.

BRIEF DESCRIPTION OF THE DRAWINGS

The above and/or additional aspects and advantages of the disclosure will become apparent and intelligible from the following descriptions of embodiments combined with accompanying drawings, wherein:

FIG. 1 is two focus curve diagrams in different frequencies in a method for automatic focus control in the disclosure, which show relations between focus positions and estimated focus values;

FIG. 2 is a process flow chart of one embodiment of a method for camera rapid automatic focusing in the disclosure;

DETAILED DESCRIPTION

Figure 3:
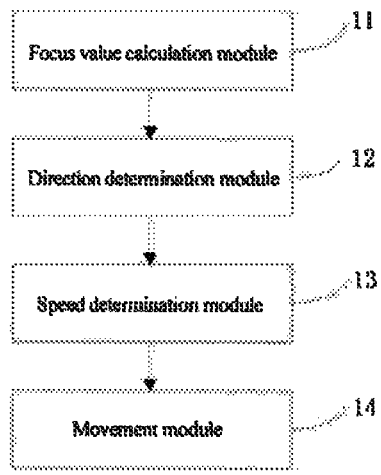
FIG. 3 is a structural block diagram of one embodiment of a device for camera rapid automatic focusing in the disclosure.

The disclosure will be further described combined with the accompanying drawings and illustrative embodiments below. The illustrative embodiments are shown in the accompanying drawings, throughout which same or similar reference numerals denote same or similar elements or elements with same or similar functions. The embodiments described with reference to the accompanying drawings below are illustrative, and are used only for construing the disclosure but shall not be construed as limitations to the disclosure. In addition, detailed descriptions of known techniques will be omitted if they are not necessary for illustrating features of the disclosure.

As could be understood by a person skilled in the art, the singular forms "a", "one", "said" and "the" used herein may also include plural forms, unless otherwise indicated. It should be further understood that the word "comprise" used in the description of the disclosure refers to existence of the features, integers, steps, operations, elements and/or assemblies but does not exclude existence or addition of one or more other features, integers, steps, operations, elements, assemblies and/or groups thereof. It should be understood that, when an element is referred to as being "connected" or "coupled" to another element, the element may be directly connected or coupled to other elements, or there may also exist an intermediate element. In addition, the word "connect" or "couple" used herein may include wireless connection or wireless coupling. The word "and/or" used herein includes all or any unit and all combinations of one or more associated listed items.

As could be understood by a person skilled in the art, all the terms (including technical terms and scientific terms) used herein have same meanings as they are generally understood by a person ordinarily skilled in the field to which the disclosure pertains, unless otherwise defined. It should also be understood that, terms such as those defined in a general dictionary should be construed as having meanings consistent with those in the context of the prior art and, unless specifically defined as herein, will not be interpreted with ideal or quite formal meanings.

It should be noticed that the method for rapid automatic focusing according to the disclosure is applied to an automatic focus process of a camera or a video camera at the time of capturing an image. Of course, the method according to the disclosure may also be applied to devices with a photographing function, such as a cellphone, a PAD, a Portable Multimedia Player (PMP), a TV or the like.

Specifically, referring to FIG. 2, which is a process flow chart of one embodiment of the method for camera rapid automatic focusing in the disclosure, the method comprises the following steps:

S11: a focus value calculation step of driving a lens to move to multiple different focus positions to acquire respective image data of a certain object, and calculating a corresponding estimated focus value in a first high frequency and a corresponding determined focus value in a second high frequency for each image data, wherein a frequency value in the second high frequency is greater than a frequency value in the first high frequency.

It should be noticed that, the disclosure drives a lens to move between the lens and an object through driving means, and presets a first speed value at which the lens moves, and stops the lens based on a preset time interval, so as to acquire corresponding image data at a current focus position, and can acquire image data at multiple different focus positions, and calculate a corresponding estimated focus value in a first high frequency for the image data and calculate a corresponding determined focus value in a second high frequency for the image data.

It should be noticed that the driving means may be a stepping motor, which is driven to rotate under the control of a controller or a driver, so as to drive movement of the lens. It will not be difficult to understand that the preset time interval and the first speed value at which the lens initially moves may be stored in advance in a storage medium, wherein the storage medium may be a Synchronous Dynamic Random Access Memory (SDRAM), Multi-Chip-Package (MCP) memory or a Dynamic Random Access Memory (DRAM).

It should be noticed that the first speed value at which the lens moves may also be understood as an initial unit step length, and the step length refers to a distance of movement of the lens during a period from a current focus position corresponding to the start of movement to the stop of the movement. In an actual operation process, the unit step length is generally represented by a pulse number of a specific pulse width, so its specific numerical value is related to relevant parameters of the used controller, driver and motor, and meanwhile the numerical value of the step length also determines the real-time and robustness of an algorithm to a certain extent, and thus shall be determined through experiments according to actual system constitution. The step length generally produces the following influences upon the entire method: if the step length is too small, time consumption of the automatic focus process will be serious, and meanwhile it will be made easy to be trapped at the local pole in a focus start phase; however, if the step length is too large, it will be made easy to override a maximum of the estimated focus values in a search process of the maximum, and if the overridden distance is too great, the algorithm adopted in the method will be disabled to converge.

It will not be difficult to understand that: if it is assumed that the multiple focus positions where the lens is driven to move include a target focus position, then multiple groups of estimated focus values and corresponding focus positions thereof may form the focus curve S1 diagram as shown in FIG. 1, and for the same reason, multiple groups of determined focus values and corresponding focus positions thereof may form the focus curve S2 diagram as shown in FIG. 1. The same focus position corresponds to one estimated focus value and one determined focus value, and both the maximum of the estimated focus values and the maximum of the determined focus values correspond to the same target focus position.

Specifically, the present embodiment, by invoking driving means, changes a distance between the lens and the object based on a certain time interval and acquires image data of a certain frame of the image at focus positions corresponding to the distance. Then, de-noising, gamma correction, color filter array interpolation, color matrix processing, color correction or color enhancement is performed on the image data through an image signal processing device to improve image quality, and by performing filtering and de-noising by two high-pass filters or band-pass filters in different frequency bands, high-frequency component data of the image data in the two different frequency bands can be obtained. Then based on the acquired data and a preset first calculation rule, a corresponding estimated focus value in the first high frequency f1 and a corresponding determined focus value in the second frequency f2 can be calculated, where f2>f1.

Thus it will not be difficult to understand that, in FIG. 1, since more noise can be filtered in the second high frequency f2, the focus curve corresponding to the second high frequency f2 at a position farther from the target focus position is gentler than the focus curve corresponding to the first high frequency f1 at the same focus position; however, a curve change rate of the focus curve corresponding to the second high frequency f2 at a position closer to the target focus position is greater than a slope of the focus curve corresponding to the first high frequency f1 at the same focus position. That is, by judging a slope value of curve change in the second high frequency f2, it can be obtained more accurately that the current focus position of the lens is reaching the target focus position. Hereinafter, it will be described in detail how to use curve features in the second high frequency f2 to prompt that the lens is reaching the target focus position, so as to change a speed of movement of the lens.

Specifically, as shown by one embodiment of the disclosure, after the image data at the multiple focus positions are acquired, corresponding estimated focus value and determined focus value are further calculated for each of the multiple focus positions based on a preset first calculation rule, wherein the preset first calculation rule is preset to be stored in a storage medium, wherein the storage medium may be a Synchronous Dynamic Random Access Memory (SDRAM), Multi-Chip-Package (MCP) memory or a Dynamic Random Access Memory (DRAM).

It should be noticed that the estimated focus value and the determined focus value described in the disclosure refer to numerical value estimation indices representing states of a characterizing portion and a profile portion of a clearly visible image. Thus for the estimated focus value, the estimated focus value can be calculated through edge enhancement of differences in brightness data between adjacent pixels of the image, or, the estimated focus value can also be calculated according to a gray value of a pixel, a reciprocal of brightness, a deviation of brightness and the like.

As shown by one embodiment of the disclosure, a corresponding algorithm for calculating corresponding estimated focus value and determined focus value for each of the multiple focus positions in disclosure is:

$$\text{Estimated focus value} = \Sigma_{x=0}^{n} \Sigma_{y=0}^{n} |hpf\_o(x,y)|^2,$$

where the x denotes a horizontal high-frequency component value, and the y denotes a vertical high-frequency component value. This algorithm obtains the estimated focus value by performing an accumulation on all horizontal x and vertical y high-frequency energy values of the obtained current frame of image data of the data image.

Further, referring to FIG. 2, the method in one embodiment of the disclosure further comprises the following step:

S12: a direction determination step of calculating a rate of change between a current determined focus value and a previous determined focus value, and determining a direction of movement of the lens in a next movement on the basis of the rate of change being either positive or negative.

It will not be difficult to understand from aforesaid step that, when the focus curve corresponding to the second frequency f2 moves from a gentle position to the vicinity of the target focus position, the change of the slope of the curve is greater; that is, it can be judged, from the rate of change of the curve, whether an area where the current focus position lies is close to the target focus position. In one embodiment of the disclosure, the algorithm for calculating the rate of change between the acquired current determined focus value and the previous determined focus value is:

Change rate=(Current determined focus value−Previous determined focus value)÷Step length, wherein the step length is a step length for the lens to move from a focus position corresponding to the previous determined focus value to a focus position corresponding to the current determined focus value.

Further, in one embodiment of the disclosure, the direction of movement of the lens in the next movement is determined on the basis of the rate of change being either positive or negative. When the calculated rate of change between the acquired current determined focus value and the previous determined focus value is positive, it is represented that the current determined focus value is greater than the previous determined focus value, that is, the current focus position does not override a peak value of the target focus position, then it can be determined that a current direction of movement of the lens is the direction of movement of the lens in the next movement; and otherwise, when the rate of change is negative, it is represented that the current determined focus value is smaller than the previous determined focus value, that is, the current focus position possibly has overridden the peak value of the target focus position or has overridden one local pole. Thus in the present embodiment, it is also necessary to further judge whether the current focus position is only the local pole which has been overridden.

Specifically, in one embodiment of the disclosure, an estimated focus threshold is preset; when it is already judged in the direction determination step that the acquired rate of change is negative, it is also necessary to compare the current estimated focus value with the preset estimated focus threshold; when the estimated focus threshold is greater than or equal to the estimated focus value, it is represented that the estimated focus value is not the local pole, which indicates that the target focus position has been overridden, then the direction of movement of the lens in the next movement is opposite to the current direction of movement; and otherwise, when the current estimated focus value is less than the estimated focus threshold, it is represented that the previous estimated focus value is the local pole, then the current direction of movement of the lens is the direction of movement in the next movement.

Further, in one embodiment of the disclosure, the estimated focus threshold corresponds to a scenario corresponding to an object in the lens; wherein the scenario is obtained through recognition by a preset scenario recognition algorithm. It will not be difficult to understand that in the present embodiment, a scenario recognition algorithm is preset, and different scenarios and estimated focus thresholds are stored in association. Specifically, in the present embodiment, light intensity information of the image data, as well as a change law and a distribution condition of the obtained estimated focus values can be analyzed according to the acquired image data to judge a current scenario of the object.

Further, when determining the direction of movement of the lens in the next movement, it is also necessary to synchronously determine a speed of movement of the lens in the next movement. Specifically, referring to FIG. 2, in one embodiment of the method according to the disclosure, the following step is further comprised:

S13: a speed determination step of comparing the rate of change with a preset focus change threshold, and determining a speed of movement of the lens in the next movement on the basis of a comparison result.

Specifically, in one embodiment of the disclosure, when the rate of change obtained in aforesaid step is less than the focus change threshold, it is represented that the current focus position is still located in a gentler area in the S2 curve as depicted in FIG. 1, that is, the current focus position is still at a certain distance from the target focus position, then movement can be continued at a first speed at which the lens currently moves; otherwise, when the rate of change is not less than the preset focus change threshold, it is represented that the current focus position is located in an area where the change of the slope is large in the S2 curve as depicted in FIG. 1, that is, the current focus position is near the target focus position, then a preset second speed value is used as the speed of movement of the lens in the next movement, wherein the second speed value is less than the first speed value. Of course, it will not be difficult to understand that, when the rate of change is not less than the preset focus change threshold, it is also possibly represented that the current focus position is located on a pseudo peak of the S2 curve, i.e., near a local pole where noise is located. Hereinafter, how to judge whether the focus position is near the local pole will be described in detail.

Specifically, in one embodiment of the disclosure, an estimated focus threshold is preset; when it is obtained that the rate of change is not less than the preset focus change threshold, a current estimated focus value is acquired, and it is judged whether the current estimated focus value is greater than the preset focus change threshold; if YES, it is represented that the estimated focus value is not the local pole, then a preset second speed value is used as the speed of movement of the lens in the next movement; otherwise, when the current estimated focus value is not greater than the preset estimated focus threshold, it is represented that the focus position where the change of the rate occurs is impossibly near the target focus position, but very possibly near the local pole, then a preset third value is used as the speed of movement of the lens in the next movement, wherein the third speed value is greater than the second speed value and is less than the first speed value. Of course, the lens may also be continued to be moved at the faster first speed herein, but a third speed value is set to avoid a case where the target focus position is overridden due to the quite fast first speed in some application scenarios, thus improving the precision and reliability of the system. It should be noticed that all the estimated focus threshold, the second speed value and the third speed value are stored in advance in a storage medium, wherein the storage medium may be a Synchronous Dynamic Random Access Memory (SDRAM), Multi-Chip-Package (MCP) memory or a Dynamic Random Access Memory (DRAM).

Further, in one embodiment of the disclosure, the estimated focus threshold corresponds to a scenario corresponding to an object in the lens; wherein the scenario is obtained through recognition by a preset scenario recognition algorithm. It will not be difficult to understand that in the present embodiment, a scenario recognition algorithm is preset, and different scenarios and estimated focus thresholds are stored in association. Specifically, in the present embodiment, light intensity information of the image data, as well as a change law and a distribution condition of the obtained estimated focus values can be analyzed according to the acquired image data to judge a current scenario of the object.

Further, the disclosure further comprises the following step:

S14: repeatedly performing said focus value calculation step, said direction determination step and said speed determination step until the lens moves to a focus position corresponding to a maximum of the estimated focus values.

It will not be difficult to understand that, said focus value calculation step, said direction determination step and said speed determination step are performed synchronously, until the lens moves to a focus position corresponding to a maximum of the estimated focus values. Specifically, in the step, driving means is invoked to move the lens to the target focus position. It should be noticed that the driving means may be a stepping motor, which is driven to rotate under the control of a controller or a driver, so as to drive movement of the lens.

The disclosure provides a method for camera rapid automatic focusing, which: acquires image data of an object at multiple different focus positions between a lens and the object; and calculates an estimated focus value in a first high frequency and a determined focus value in a second high frequency for each image data; and calculates a rate of change between a current determined focus value and a previous determined focus value, and determines a direction of movement of the lens in a next movement on the basis of a comparison result of the rate of change with a preset focus change threshold, until the lens moves to a focus position corresponding to a maximum of the estimated focus value. That is, the disclosure can change a speed of movement of the lens on the basis of a value of the rate of change, that is, employ different speeds of movement at different positions, thus effectively reducing focusing time, while taking into consideration focusing speed and precision, and providing high reliability and practicability.

The above focusing method according to the disclosure, in the process of determining a direction of movement of a lens, when a rate of change of an acquired determined focus value is negative, compares a current estimated focus value with a preset estimated focus threshold; when the estimated focus value is less than the preset estimated focus threshold, it is represented that the estimated focus value is possibly near a local pole, then a current direction of movement is determined as the above direction of movement; otherwise, a direction of movement of the lens is changed. It is made possible to identify the local pole, thus avoiding a problem of shaking due to being trapped at the local pole during focusing.

Based on modularization thinking of a computer, the disclosure further provides a device for camera rapid automatic focusing. Referring to FIG. 3, the device comprises a focus value calculation module 11, a direction determination module 12, a speed determination module 13 and a movement module 14. It should be noticed that the device according to the disclosure is applied to a camera or a video camera with an automatic focus function. Of course, the device according to the disclosure may also be applied to devices with a photographing function, such as a cellphone, a PAD, a Portable Multimedia Player (PMP), a TV or the like. To facilitate descriptions, the embodiments of the disclosure illustratively describe its detailed implementation by taking a digital video camera as an example; however, this embodiment cannot constitute limitations to the disclosure. Below, specific functions implemented by the respective modules will be described in detail.

The focus value calculation module 11 is used for driving a lens to move to multiple different focus positions to acquire respective image data of a certain object, and calculating a corresponding estimated focus value in a first high frequency and a corresponding determined focus value in a second high frequency for each image data, wherein a frequency value in the second high frequency is greater than a frequency value in the first high frequency.

It should be noticed that the focus value calculation module 11 according to the disclosure drives a lens to move between the lens and an object through driving means, and presets a first speed value at which the lens moves, and stops the lens based on a preset time interval, so as to acquire corresponding image data at a current focus position; that is, the focus value calculation module 11 can acquire image data at multiple different focus positions, and calculate a corresponding estimated focus value in a first high frequency for the image data and calculate a corresponding determined focus value in a second high frequency for the image data It should be noticed that the driving means may be a stepping motor, which is driven to rotate under the control of a controller or a driver, so as to drive movement of the lens. It will not be difficult to understand that the preset time interval and the first speed value at which the lens initially moves which are preset in the focus value calculation module 11 may be stored in advance in a storage medium, wherein the storage medium may be a Synchronous Dynamic Random Access Memory (SDRAM), Multi-Chip-Package (MCP) memory or a Dynamic Random Access Memory (DRAM).

It should be noticed that the first speed value at which the lens moves in the focus value calculation module 11 may also be understood as an initial unit step length, and the step length refers to a distance of movement of the lens during a period from a current focus position corresponding to the start of movement to the stop of the movement. In an actual operation process, the unit step length is generally represented by a pulse number of a specific pulse width, so its specific numerical value is related to relevant parameters of the used controller, driver and motor, and meanwhile the numerical value of the step length also determines the real-time and robustness of an algorithm to a certain extent, and thus shall be determined through experiments according to actual system constitution. The step length generally produces the following influences upon the entire method: if the step length is too small, time consumption of the automatic focus process will be serious, and meanwhile it will be made easy to be trapped at the local pole in a focus start phase; however, if the step length is too large, it will be made easy to override a maximum of the estimated focus values in a search process of the maximum, and if the overridden distance is too great, the algorithm adopted in the device will be disabled to converge.

It will not be difficult to understand that: if it is assumed that the multiple focus positions where the lens is driven to move include a target focus position, then multiple groups of estimated focus values and corresponding focus positions thereof may form the focus curve S1 diagram as shown in FIG. 1, and for the same reason, multiple groups of determined focus values and corresponding focus positions thereof may form the focus curve S2 diagram as shown in FIG. 1. The same focus position corresponds to one estimated focus value and one determined focus value, and both the maximum of the estimated focus values and the maximum of the determined focus values correspond to the same target focus position.

Specifically, the focus value calculation module 11 according to the present embodiment, by invoking driving means, changes a distance between the lens and the object based on a certain time interval and acquires image data of a certain frame of the image at focus positions corresponding to the distance. Then, the focus value calculation module 11 performs de-noising, gamma correction, color filter array interpolation, color matrix processing, color correction or color enhancement on the image data through an image signal processing device to improve image quality, and by performing filtering and de-noising by two high-pass filters or band-pass filters in different frequency bands, high-frequency component data of the image data in the two different frequency bands can be obtained. Then based on the acquired data and a preset first calculation rule, the focus value calculation module 11 can calculate a corresponding estimated focus value in the first high frequency f1 and a corresponding determined focus value in the second frequency f2, where f2>f1.

Thus it will not be difficult to understand that, in FIG. 1, since more noise can be filtered in the second high frequency f2, the focus curve corresponding to the second high frequency f2 at a position farther from the target focus position is gentler than the focus curve corresponding to the first high frequency f1 at the same focus position; however, a curve change rate of the focus curve corresponding to the second high frequency f2 at a position closer to the target focus position is greater than a slope of the focus curve corresponding to the first high frequency f1 at the same focus position. That is, by judging a slope value of curve change in the second high frequency f2, it can be obtained more accurately that the current focus position of the lens is reaching the target focus position. Hereinafter, it will be described in detail how to use curve features in the second high frequency f2 to prompt that the lens is reaching the target focus position, so as to change a speed of movement of the lens.

Specifically, as shown by one embodiment of the disclosure, after acquiring the image data at the multiple focus positions, the focus value calculation module 11 further calculates corresponding estimated focus value and determined focus value for each of the multiple focus positions based on a preset first calculation rule, wherein the preset first calculation rule is preset to be stored in a storage medium, wherein the storage medium may be a Synchronous Dynamic Random Access Memory (SDRAM), Multi-Chip-Package (MCP) memory or a Dynamic Random Access Memory (DRAM).

It should be noticed that the estimated focus value and the determined focus value described in the disclosure refer to numerical value estimation indices representing states of a characterizing portion and a profile portion of a clearly visible image. Thus for the estimated focus value, the estimated focus value can be calculated through edge enhancement of differences in brightness data between adjacent pixels of the image, or, the estimated focus value can also be calculated according to a gray value of a pixel, a reciprocal of brightness, a deviation of brightness and the like.

As shown by one embodiment of the disclosure, a corresponding algorithm for calculating corresponding estimated focus value and determined focus value for each of the multiple focus positions by the focus value calculation module 11 in the disclosure is:

$$\text{Estimated focus value} = \Sigma_{x=0}{}^{n} \Sigma_{y=0}{}^{n} |hpf\_o(x,y)|^2,$$

where the x denotes a horizontal high-frequency component value, and the y denotes a vertical high-frequency component value. This algorithm obtains the estimated focus value by performing an accumulation on all horizontal x and vertical y high-frequency energy values of the obtained current frame of image data of the data image.

Further, referring to FIG. 3, the direction determination module 12 in the disclosure is used for calculating a rate of change between a current determined focus value and a previous determined focus value, and determining a direction of movement of the lens in a next movement on the basis of the rate of change being either positive or negative.

It will not be difficult to understand from aforesaid focus value calculation module 11 that, when the focus curve corresponding to the second frequency f2 moves from a gentle position to the vicinity of the target focus position, the change of the slope of the curve is greater; that is, it can be judged, from the rate of change of the curve, whether an area where the current focus position lies is close to the target focus position. In one embodiment of the disclosure, the algorithm for calculating the rate of change between the acquired current determined focus value and the previous determined focus value by the direction determination module 12 is:

Change rate=(Current determined focus value−Previous determined focus value)÷Step length, wherein the step length is a step length for the lens to move from a focus position corresponding to the previous determined focus value to a focus position corresponding to the current determined focus value.

Further, in one embodiment of the disclosure, the direction determination module 12 determines the direction of movement of the lens in the next movement on the basis of the rate of change being either positive or negative. When the rate of change between the acquired current determined focus value and the previous determined focus value which is calculated by the direction determination module 12 is positive, it is represented that the current determined focus value is greater than the previous determined focus value, that is, the current focus position does not override a peak value of the target focus position, then it can be determined that a current direction of movement of the lens is the direction of movement of the lens in the next movement; and otherwise, when the rate of change which is calculated by the direction determination module 12 is negative, it is represented that the current determined focus value is smaller than the previous determined focus value, that is, the current focus position possibly has overridden the peak value of the target focus position or has overridden one local pole. Thus in the present embodiment, the direction determination module 12 also necessarily further judges whether the current focus position is only the local pole which has been overridden.

Specifically, in one embodiment of the disclosure, an estimated focus threshold is preset in the direction determination module 12; when it is already judged by the direction determination module 12 that the acquired rate of change is negative, it is also necessary to compare the current estimated focus value with the preset estimated focus threshold; when the estimated focus threshold is greater than or equal to the estimated focus value, it is represented that the estimated focus value is not the local pole, which indicates that the target focus position has been overridden, then the direction of movement of the lens in the next movement is opposite to the current direction of movement; and otherwise, when it is obtained by the direction determination module 12 that the current estimated focus value is less than the estimated focus threshold, it is represented that the previous estimated focus value is the local pole, then the current direction of movement of the lens is the direction of movement in the next movement.

Further, in one embodiment of the disclosure, the estimated focus threshold corresponds to a scenario corresponding to an object in the lens; wherein the scenario is obtained through recognition by a preset scenario recognition algorithm. It will not be difficult to understand that in the present embodiment, a scenario recognition algorithm is preset, and different scenarios and estimated focus thresholds are stored in association. Specifically, in the present embodiment, light intensity information of the image data, as well as a change law and a distribution condition of the obtained estimated focus values can be analyzed according to the acquired image data to judge a current scenario of the object.

Further, when the direction determination module 12 determines the direction of movement of the lens in the next movement, it is also necessary to synchronously determine a speed of movement of the lens in the next movement. Specifically, referring to FIG. 3, the speed determination module 13 in the disclosure is used for comparing the rate of change with a preset focus change threshold, and determining a speed of movement of the lens in the next movement on the basis of a comparison result.

Specifically, in one embodiment of the disclosure, when the rate of change obtained in the speed determination module 13 is less than the focus change threshold, it is represented that the current focus position is still located in a gentler area in the S2 curve as depicted in FIG. 1, that is, the current focus position is still at a certain distance from the target focus position, then movement can be continued at a first speed at which the lens currently moves; otherwise, when the rate of change obtained in the speed determination module 13 is not less than the preset focus change threshold, it is represented that the current focus position is located in an area where the change of the slope is large in the S2 curve as depicted in FIG. 1, that is, the current focus position is near the target focus position, then a preset second speed value is used as the speed of movement of the lens in the next movement, wherein the second speed value is less than the first speed value. Of course, it will not be difficult to understand that, when the rate of change is not less than the preset focus change threshold, it is also possibly represented that the current focus position is located on a pseudo peak of the S2 curve, i.e., near a local pole where noise is located. Hereinafter, how the speed determination module 13 judges whether the focus position is near the local pole will be described in detail.

Specifically, in one embodiment of the disclosure, an estimated focus threshold is preset in the speed determination module 13; when it is obtained that the rate of change is not less than the preset focus change threshold, the speed determination module 13 acquires a current estimated focus value, and judges whether the current estimated focus value is greater than the preset focus change threshold; if YES, it is represented that the estimated focus value is not the local pole, then the speed determination module 13 uses a preset second speed value as the speed of movement of the lens in the next movement; otherwise, when it is obtained in the speed determination module 13 that the current estimated focus value is not greater than the preset estimated focus threshold, it is represented that the focus position where the change of the rate occurs is impossibly near the target focus position, but very possibly near the local pole, then the speed determination module 13 uses a preset third value as the speed of movement of the lens in the next movement, wherein the third speed value is greater than the second speed value and is less than the first speed value. Of course, the speed determination module 13 may also continue to move the lens at the faster first speed herein, but a third speed value is set to avoid a case where the target focus position is overridden due to the quite fast first speed in some application scenarios, thus improving the precision and reliability of the system. It should be noticed that all the estimated focus threshold, the second speed value and the third speed value are stored in advance in a storage medium, wherein the storage medium may be a Synchronous Dynamic Random Access Memory (SDRAM), Multi-Chip-Package (MCP) memory or a Dynamic Random Access Memory (DRAM).

Further, in one embodiment of the disclosure, the estimated focus threshold corresponds to a scenario corresponding to an object in the lens; wherein the scenario is obtained through recognition by a preset scenario recognition algorithm. It will not be difficult to understand that in the speed determination module 13 in the present embodiment, a scenario recognition algorithm is preset, and different scenarios and estimated focus thresholds are stored in association. Specifically, the speed determination module 13 in the present embodiment can analyze light intensity information of the image data, as well as a change law and a distribution condition of the obtained estimated focus values according to the acquired image data to judge a current scenario of the object.

Further, referring to FIG. 3, the movement module 14 according to the disclosure is used for repeatedly invoking the focus value calculation module, the direction determination module and the speed determination module to perform corresponding operations, until the lens moves to a focus position corresponding to a maximum of the estimated focus values.

It will not be difficult to understand that the movement module 14 repeatedly invokes said focus value calculation module 11, said direction determination module 12 and said speed determination module 13 to perform corresponding operations, until the lens moves to a focus position corresponding to a maximum of the estimated focus values. Specifically, the movement module 14 invokes driving means to move the lens to the target focus position. It should be noticed that the driving means may be a stepping motor, which is driven to rotate under the control of a controller or a driver, so as to drive movement of the lens.

The disclosure provides a device for camera rapid automatic focusing, which acquires image data of an object at multiple different focus positions between a lens and the object through a focus value calculation module 11, and calculates an estimated focus value in a first high frequency and a determined focus value in a second high frequency for each image data; then a direction determination module 12 calculates a rate of change between a current determined focus value and a previous determined focus value; a speed determination module 13 determines a direction of movement of the lens in a next movement on the basis of a comparison result of the rate of change with a preset focus change threshold, until the lens moves to a focus position corresponding to a maximum of the estimated focus value. That is, the disclosure can change a speed of movement of the lens on the basis of a value of the rate of change through the speed determination module 13, that is, employ different speeds of movement at different positions, thus effectively reducing focusing time, while taking into consideration focusing speed and precision, and providing high reliability and practicability.

The above focusing device according to the disclosure, in the process of determining a direction of movement of a lens, when a rate of change of a determined focus value which is calculated by the direction determination module 12 is negative, the speed determination module 13 compares a current estimated focus value with a preset estimated focus threshold; when the estimated focus value is less than the preset estimated focus threshold, it is represented that the estimated focus value is possibly near a local pole, then a current direction of movement is determined as the above direction of movement; otherwise, a direction of movement of the lens is changed. It is made possible to identify the local pole, thus avoiding a problem of shaking due to being trapped at the local pole during focusing.

The description provided here explains plenty of details. However, it can be understood that the embodiments of the disclosure can be implemented without these specific details. The known methods, structure and technology are not shown in detail in some embodiments, so as not to obscure the understanding of the description.

Although some illustrative embodiments of the invention are illustrated above, those skilled in the art will understand that, the illustrative embodiments can be modified without departing from the spirit and principle of the embodiments of the invention. The scopes of the embodiments of the invention are limited by the claims and equivalents thereof.

As for the device embodiments, because they are similar basically to the method embodiments, the description thereof is simple relatively and similar content can be referred to the description of the method embodiments.

The algorithm and display provided here have no inherent relation with any specific computer, virtual system or other devices. Various general-purpose systems can be used together with the teaching based on this. According to the description above, the structure required to construct this kind of system is obvious. Besides, the disclosure is not directed at any specific programming language. It should be understood that various programming language can be used for achieving the content of the disclosure described here, and above description of specific language is for disclosing the optimum embodiment of the disclosure.

The description provided here explains plenty of details. However, it can be understood that the embodiments of the disclosure can be implemented without these specific details. The known methods, structure and technology are not shown in detail in some embodiments, so as not to obscure the understanding of the description.

Similarly, it should be understood that in order to simplify the disclosure and help to understand one or more of the various aspects of the disclosure, in the above description of the illustrative embodiments of the disclosure, the various features of the disclosure are sometimes grouped into a single embodiment, drawing, or description thereof. However, the method disclosed should not be explained as reflecting the following intention: that is, the disclosure sought for protection claims more features than the features clearly recorded in every claim. To be more precise, as is reflected in the following claims, the aspects of the disclosure are less than all the features of a single embodiment disclosed before. Therefore, the claims complying with a specific embodiment are explicitly incorporated into the specific embodiment thereby, wherein every claim itself as an independent embodiment of the disclosure.

Those skilled in the art can understand that adaptive changes can be made to the modules of the devices in the embodiment and the modules can be installed in one or more devices different from the embodiment. The modules or units or elements in the embodiment can be combined into one module or unit or element, and furthermore, they can be separated into more sub-modules or sub-units or sub-elements. Except such features and/or process or that at least some in the unit are mutually exclusive, any combinations can be adopted to combine all the features disclosed by the description (including the attached claims, abstract and figures) and any method or all process of the device or unit disclosed as such. Unless there is otherwise explicit statement, every feature disclosed by the present description (including the attached claims, abstract and figures) can be replaced by substitute feature providing the same, equivalent or similar purpose.

In addition, a person skilled in the art can understand that although some embodiments described here comprise some features instead of other features included in other embodiments, the combination of features of different embodiments means falling into the scope of the disclosure and forming different embodiments. For example, in the following claims, any one of the embodiments sought for protection can be used in various combination modes.

The various components embodiments of the disclosure can be realized by hardware, or realized by software modules running on one or more processors, or realized by combination thereof. A person skilled in the art should understand that microprocessor or digital signal processor (DSP) can be used for realizing some or all functions of some or all components of the asynchronous login device according to the embodiments in the disclosure in practice. The disclosure can also realize one part of or all devices or system programs (for example, computer programs and computer program products) used for carrying out the method described here. Such programs for realizing the disclosure can be stored in computer readable medium, or can possess one or more forms of signal. Such signals can be downloaded from the Internet website or be provided at signal carriers, or be provided in any other forms.

Figure 4:
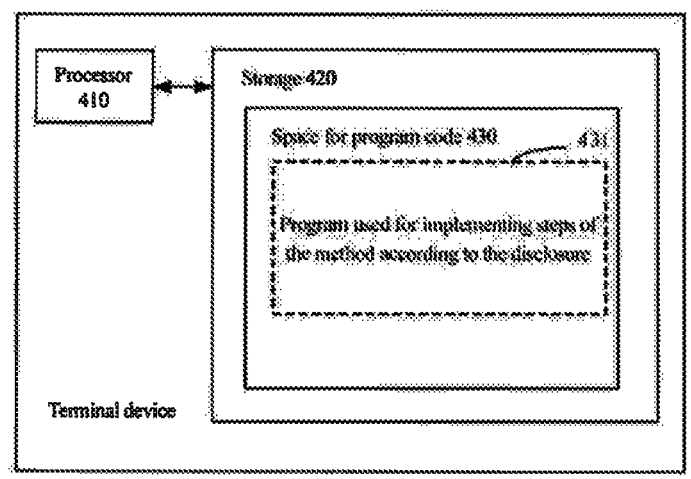
FIG. 4 is a block diagram of a terminal device for implementing the method according to the disclosure in the disclosure.
Figure 5:
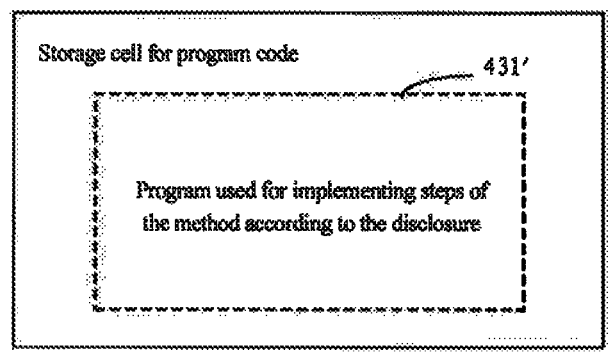
FIG. 5 is a storage cell for retaining or carrying a program code for implementing the method according to the embodiment of the disclosure in the disclosure.

For example, FIG. 4 shows a terminal device for the method for camera rapid automatic focusing according to the disclosure. The terminal device traditionally comprises a processor 410 and a computer program product in the form of storage 420 or a computer readable medium. The storage 420 can be electronic storage such as flash memory, EEPROM (Electrically Erasable Programmable Read-Only Memory), EPROM, hard disk or ROM, and the like. The storage 420 possesses storage space 430 for carrying out program code 631 of any steps of aforesaid method. For example, storage space 430 for program code can comprise various program codes 431 used for realizing any steps of aforesaid method. These program codes can be read out from one or more computer program products or write in one or more computer program products. The computer program products comprise program code carriers such as hard disk, Compact Disc (CD), memory card or floppy disk and the like. These computer program products usually are portable or fixed storage cell as said in FIG. 5. The storage cell can possess memory paragraph, storage space like the storage 420 in the terminal device in FIG. 4. The program code can be compressed in, for example, a proper form. Generally, storage cell comprises computer readable code 431', i.e. the code can be read by processors such as 410 and the like. When the codes run on a computer device, the computer device will carry out various steps of the method described above.

It should be noticed that the embodiments are intended to illustrate the disclosure and not limit this disclosure, and a person skilled in the art can design substitute embodiments without departing from the scope of the appended claims. In the claims, any reference marks between brackets should not be constructed as limit for the claims. The word "comprise" does not exclude elements or steps that are not listed in the claims. The word "a" or "one" before the elements does not exclude that more such elements exist. The disclosure can be realized by means of hardware comprising several different elements and by means of properly programmed computer. In the unit claims several devices are listed, several of the systems can be embodied by a same hardware item. The use of words first, second and third does not mean any sequence. These words can be explained as name.

In addition, it should be noticed that the language used in the disclosure is chosen for the purpose of readability and teaching, instead of for explaining or limiting the topic of the disclosure. Therefore, it is obvious for a person skilled in the art to make a lot of modification and alteration without departing from the scope and spirit of the appended claims. For the scope of the disclosure, the disclosure is illustrative instead of restrictive. The scope of the disclosure is defined by the appended claims.

What is claimed is:

1. A method for camera rapid automatic focusing, comprising:

a focus value calculation step of driving a lens to move to multiple different focus positions to acquire respective image data of a certain object, and calculating a corresponding estimated focus value in a first high frequency and a corresponding determined focus value in a second high frequency for each image data, wherein a frequency value in the second high frequency is greater than a frequency value in the first high frequency;

a direction determination step of calculating a rate of change between a current determined focus value and a previous determined focus value, and determining a direction of movement of the lens in a next movement on the basis of the rate of change being either positive or negative;

a speed determination step of comparing the rate of change with a preset focus change threshold, and determining a speed of movement of the lens in the next movement on the basis of a comparison result; and repeatedly performing said focus value calculation step, said direction determination step and said speed determination step until the lens moves to a focus position corresponding to a maximum of the estimated focus values.

2. The method according to claim 1, wherein the speed determination step further comprises:
   in a case that the rate of change is less than the preset focus change threshold, continuing to use a current preset first speed value as the speed of movement of the lens in the next movement; and
   otherwise, in a case that the rate of change is not less than the preset focus change threshold, using a preset second speed value as the speed of movement of the lens in the next movement;
   wherein the second speed value is less than the first speed value.

3. The method according to claim 2, wherein the step of, in a case that the rate of change is not less than the preset focus change threshold, using a preset second speed value as the speed of movement of the lens in the next movement further comprises:
   in a case that the rate of change is not less than the preset focus change threshold, acquiring a current estimated focus value;
   judging whether the current estimated focus value is greater than a preset estimated focus threshold;
   if YES, using a preset second speed value as the speed of movement of the lens in the next movement; otherwise, using a preset third speed value as the speed of movement of the lens in the next movement, wherein the third speed value is greater than the second speed value and is less than the first speed value.

4. The method according to claim 3, wherein the preset estimated focus threshold corresponds to a scenario corresponding to an object in the lens; wherein the scenario is obtained through recognition by a preset scenario recognition algorithm.

5. The method according to claim 1, wherein an algorithm for calculating the rate of change between the current determined focus value and the previous determined focus value is:

Change rate=(Current determined focus value−Previous determined focus value)÷Step length, wherein the step length is a step length for the lens to move from a focus position corresponding to the previous determined focus value to a focus position corresponding to the current determined focus value.

6. The method according to claim 1, wherein the direction determination step further comprises:
   in a case that the calculated rate of change between the current determined focus value and the previous determined focus value is positive, determining that a current direction of movement of the lens is the direction of movement of the lens in the next movement; and
   otherwise, in a case that the rate of change is negative, determining that a direction opposite to the current direction of movement of the lens is the direction of movement of the lens in the next movement.

7. The method according to claim 6, wherein the step of, in a case that the rate of change is negative, determining that a direction opposite to the current direction of movement of the lens is the direction of movement of the lens in the next movement further comprises the steps of:
   in a case that the rate of change is negative, acquiring a current estimated focus value;
   judging whether the current estimated focus value is greater than a preset estimated focus threshold; and
   if YES, determining that that a direction opposite to the current direction of movement of the lens is the direction of movement of the lens in the next movement; otherwise, determining that the current direction of movement of the lens is the direction of movement of the lens in the next movement.

8. The method according to claim 1, wherein the focus value calculation step further comprises:
   driving the lens to move to the multiple different focus positions at a preset first speed value to acquire the respective image data of the certain object; and
   on the basis of the acquired respective image data and a preset first calculation rule, calculating corresponding estimated focus value and determined focus value for each of the multiple focus positions.

9. The method according to claim 1, wherein the step of driving a lens to move to multiple different focus positions to acquire respective image data of a certain object comprises:
   invoking driving a means to move the lens to change a distance between the lens and the object, and acquiring the respective image data at focus positions corresponding to the distance.

10. The method according to claim 9, wherein the step of invoking driving means to change a distance between the lens and the object further comprises: invoking the driving means to change a distance between the lens and the object based on a certain time interval.

11. A device for camera rapid automatic focusing, comprising:
    one or more processors; and
    a memory; wherein one or more programs are stored in the memory, and when executed by the one or more processors, the one or more programs cause the one or more processors to:
    drive a lens to move to multiple different focus positions to acquire respective image data of a certain object, and calculate a corresponding estimated focus value in a first high frequency and a corresponding determined focus value in a second high frequency for each image data, wherein a frequency value in the second high frequency is greater than a frequency value in the first high frequency;
    calculate a rate of change between a current determined focus value and a previous determined focus value, and determine a direction of movement of the lens in a next movement on the basis of the rate of change being either positive or negative;
    compare the rate of change with a preset focus change threshold, and determine a speed of movement of the lens in the next movement on the basis of a comparison result; and
    repeatedly perform said focus value calculation, said direction determination and said speed determination until the lens moves to a focus position corresponding to a maximum of the estimated focus values.

12. The device according to claim 11, wherein the one or more processors are further caused to:
    in a case that the rate of change is less than the preset focus change threshold, continue to use a current preset first speed value as the speed of movement of the lens in the next movement; and
    otherwise, in a case that the rate of change is not less than the preset focus change threshold, use a preset second speed value as the speed of movement of the lens in the next movement; wherein the second speed value is less than the first speed value.

13. The device according to claim 12, wherein the one or more processors are further caused to:
   in a case that the rate of change is not less than the preset focus change threshold, acquire a current estimated focus value;
   judge whether the current estimated focus value is greater than a preset estimated focus threshold; and
   if YES, use a preset second speed value as the speed of movement of the lens in the next movement; otherwise, use a preset third speed value as the speed of movement of the lens in the next movement, wherein the third speed value is greater than the second speed value and is less than the first speed value.

14. The device according to claim 13, wherein the preset estimated focus threshold corresponds to a scenario corresponding to an object in the lens; wherein the scenario is obtained through recognition by a preset scenario recognition algorithm.

15. The device according to claim 11, wherein an algorithm for calculating the rate of change between the current determined focus value and the previous determined focus value is:

Change rate=(Current determined focus value−Previous determined focus value)÷Step length, wherein the step length is a step length for the lens to move from a focus position corresponding to the previous determined focus value to a focus position corresponding to the current determined focus value.

16. The device according to claim 11, wherein the one or more processors are further caused to:
   in a case that the calculated rate of change between the current determined focus value and the previous determined focus value is positive, determine that a current direction of movement of the lens is the direction of movement of the lens in the next movement; and
   otherwise, in a case that the rate of change is negative, determine that a direction opposite to the current direction of movement of the lens is the direction of movement of the lens in the next movement.

17. The device according to claim 16, wherein the one or more processors are further caused to:
   in a case that the rate of change is negative, acquire a current estimated focus value;
   judge whether the current estimated focus value is greater than a preset estimated focus threshold; and
   if YES, determine that that a direction opposite to the current direction of movement of the lens is the direction of movement of the lens in the next movement; otherwise, determine that the current direction of movement of the lens is the direction of movement of the lens in the next movement.

18. The device according to claim 11, wherein the one or more processors are further caused to:
   drive the lens to move to the multiple different focus positions at a preset first speed value to acquire the image data of the certain object; and
   on the basis of the acquired image data and a preset first calculation rule, calculate corresponding estimated focus value and determined focus value for each of the multiple focus positions.

19. The device according to claim 11, wherein the one or more processors are further caused to invoke a driving means to move the lens to change a distance between the lens and the object, and acquire the image data at focus positions corresponding to the distance.

20. The device according to claim 19, wherein the one or more processors are further caused to invoke the driving means to change a distance between the lens and the object based on a certain time interval.

* * * * *